Figure 4:
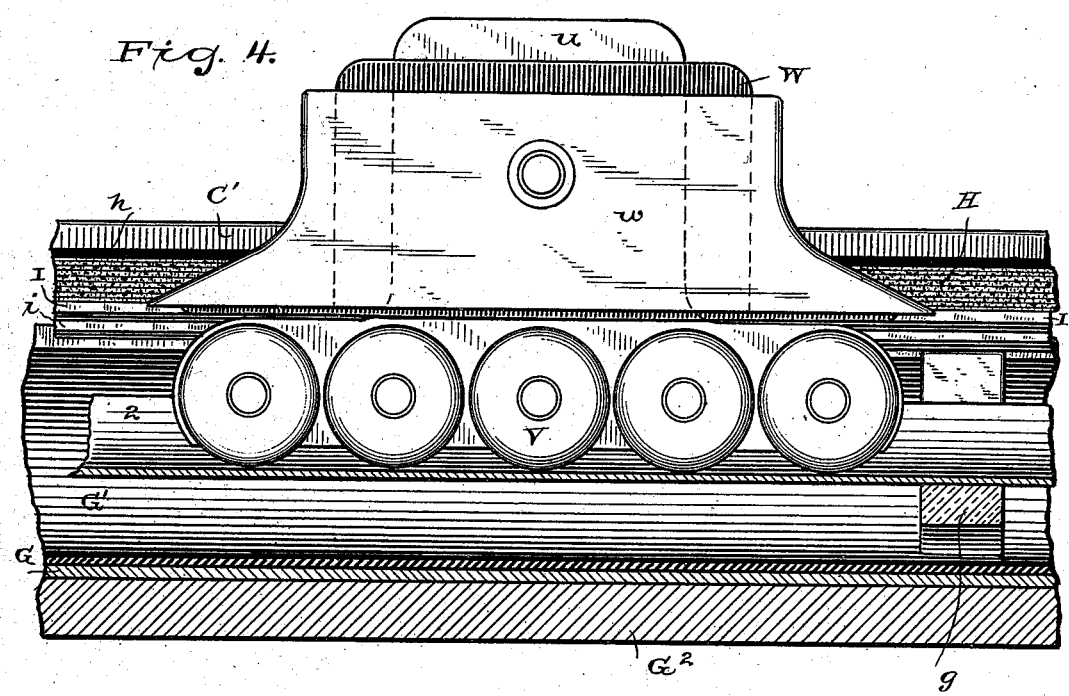

(No Model.)　　　　　　　　　　　　　　　　　　5 Sheets—Sheet 1.
C. J. VAN DEPOELE.
PNEUMATIC FLEXIBLE SLOT CONDUIT FOR ELECTRIC RAILWAY CONDUCTORS.
No. 400,375.　　　　　　　　　　Patented Mar. 26, 1889.
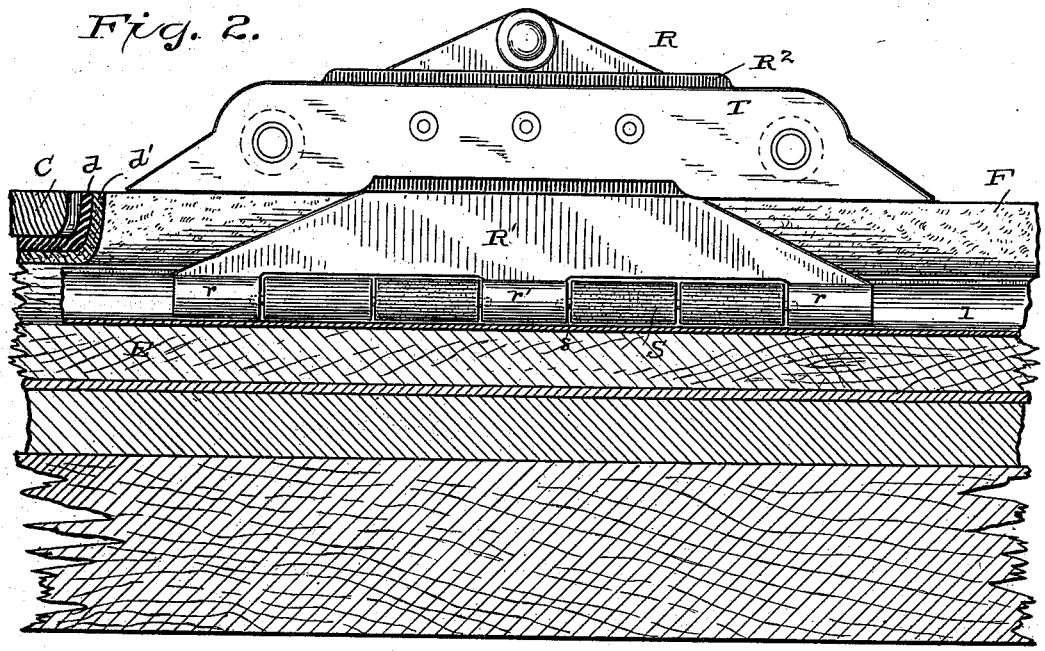
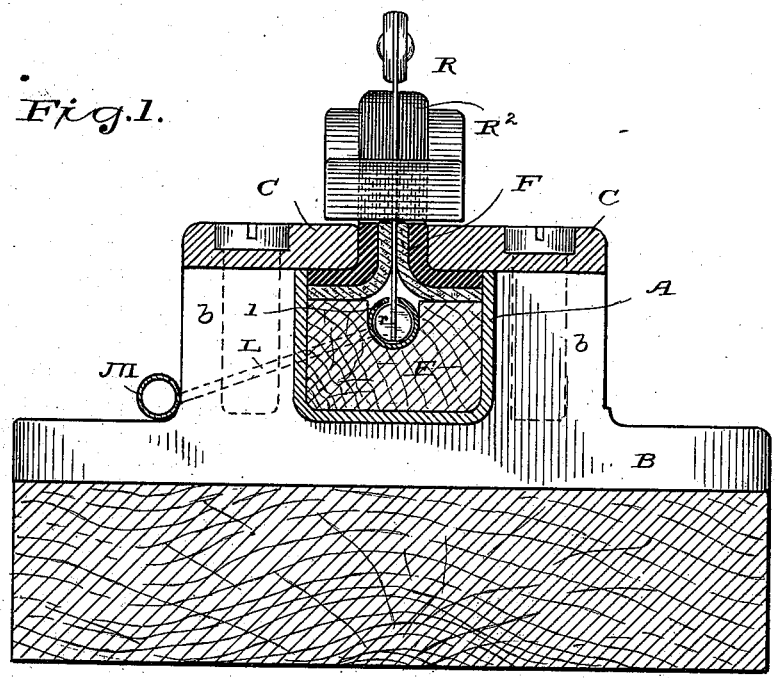
Witnesses,　　　　　　　　　　　　　　　　Inventor
H. A. Lamly　　　　　　　　　　　　　Charles J. VanDepoele
C. L. Sturtevant　　　　　　　　By Frankland James,
　　　　　　　　　　　　　　　　　　　　Attorney.

(No Model.) 5 Sheets—Sheet 2.

C. J. VAN DEPOELE.
PNEUMATIC FLEXIBLE SLOT CONDUIT FOR ELECTRIC RAILWAY CONDUCTORS.

No. 400,375. Patented Mar. 26, 1889.

Witnesses.
H. A. Lamb
C. L. Sturtevant

Inventor,
Charles J. VanDepoele
By Frankland James
Attorney (No Model.) 5 Sheets—Sheet 3.
C. J. VAN DEPOELE.
PNEUMATIC FLEXIBLE SLOT CONDUIT FOR ELECTRIC RAILWAY CONDUCTORS.
No. 400,375. Patented Mar. 26, 1889.
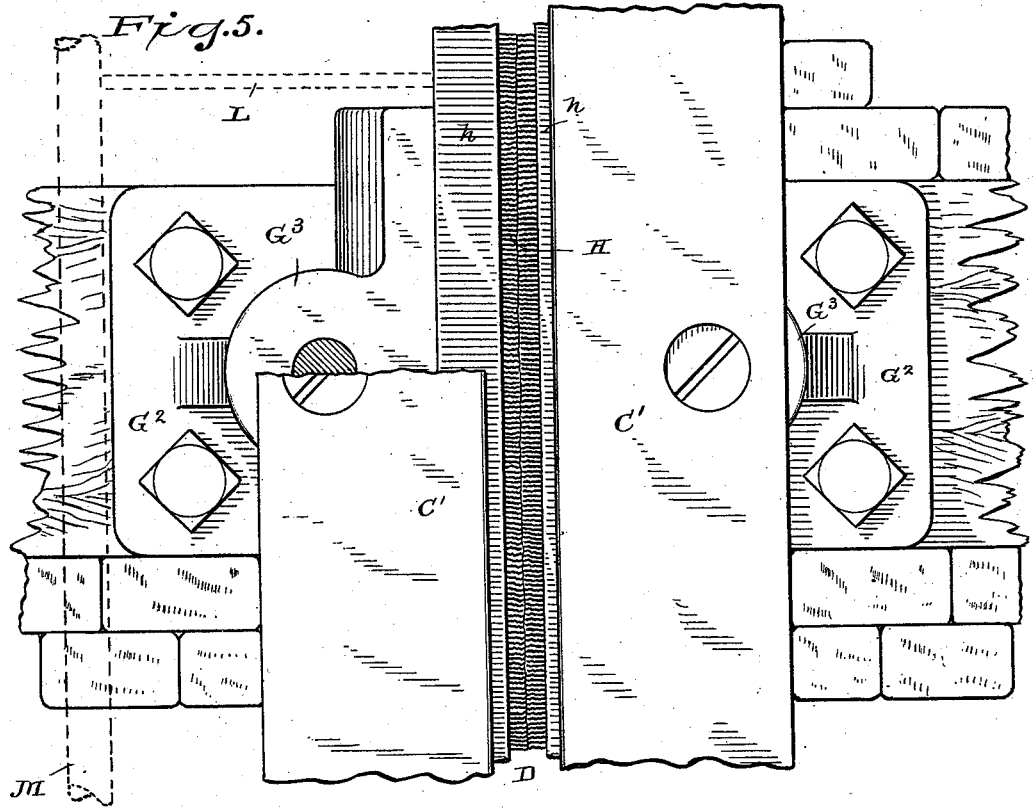
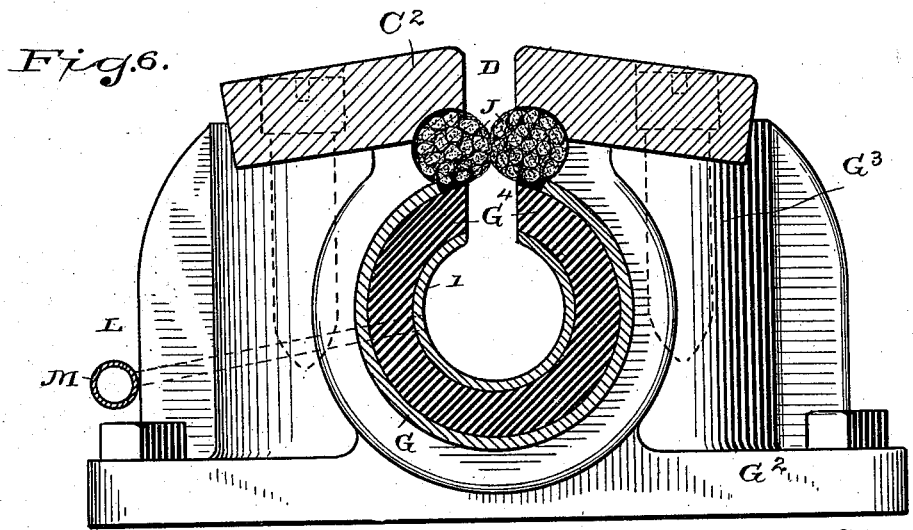
Witnesses.
H. H. Lamb
C. L. Sturtevant
Inventor,
Charles J. VanDepoele
By Frankland James
Attorney (No Model.) 5 Sheets—Sheet 4.
C. J. VAN DEPOELE.
PNEUMATIC FLEXIBLE SLOT CONDUIT FOR ELECTRIC RAILWAY CONDUCTORS.
No. 400,375. Patented Mar. 26, 1889.
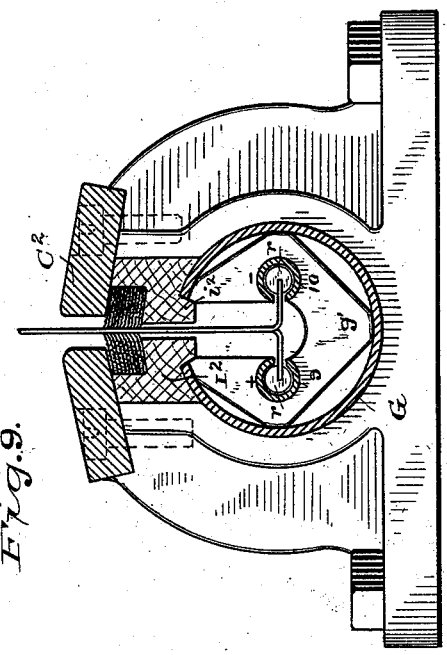
Fig. 9.
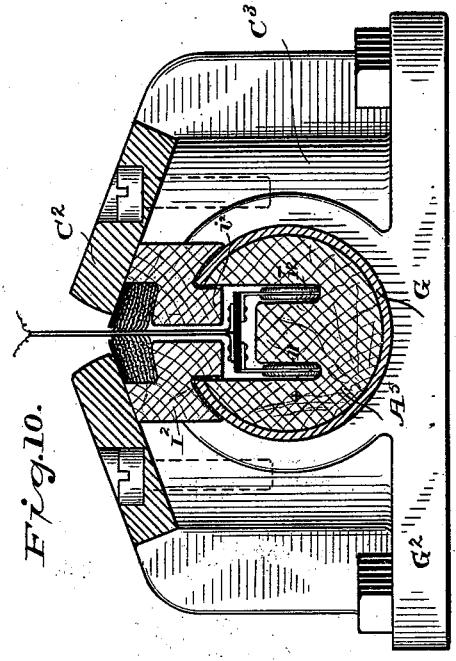
Fig. 10.
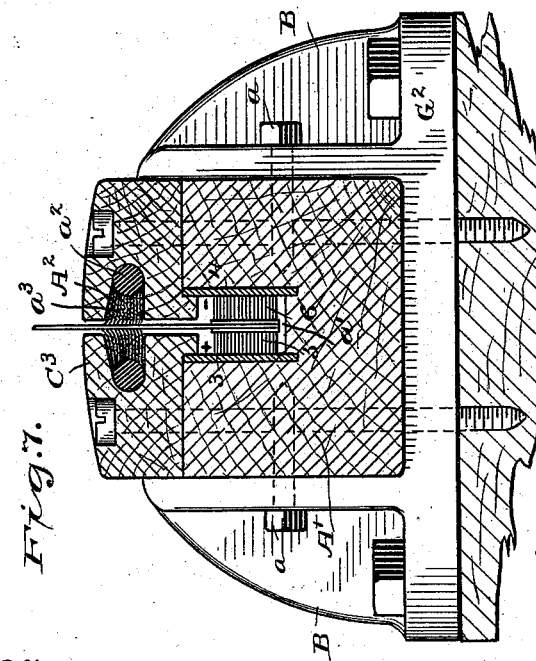
Fig. 7. Fig. 8.
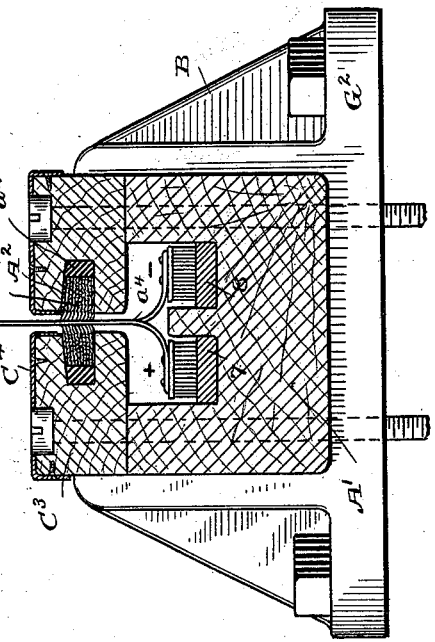
Witnesses,
H. A. Lamb
C. L. Sturtevant
Inventor
Charles J. Van Depoele
Frankland James
Attorney

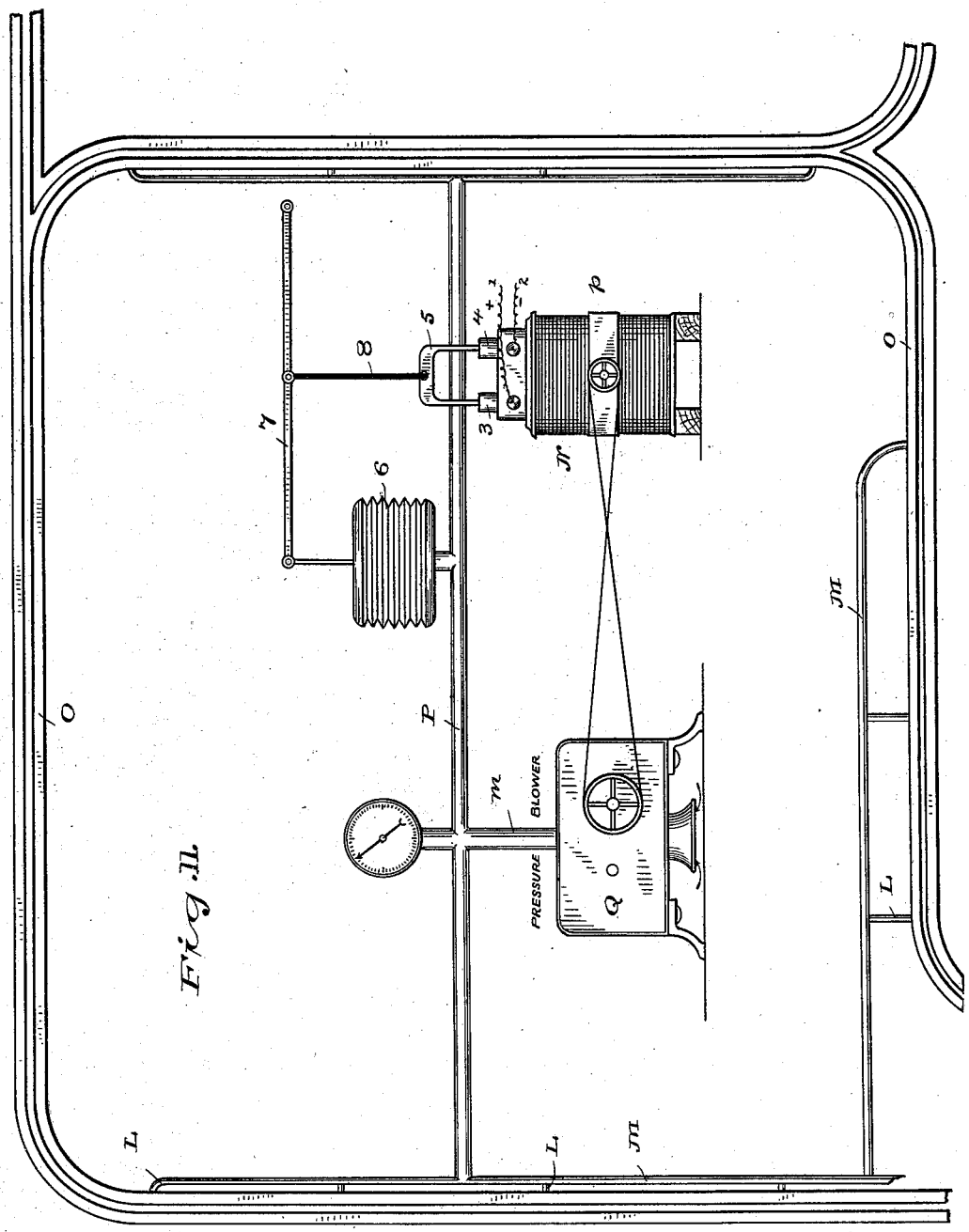

UNITED STATES PATENT OFFICE.

CHARLES J. VAN DEPOELE, OF LYNN, MASSACHUSETTS.

PNEUMATIC FLEXIBLE-SLOT CONDUIT FOR ELECTRIC-RAILWAY CONDUCTORS.

SPECIFICATION forming part of Letters Patent No. 400,375, dated March 26, 1889.

Application filed January 5, 1889. Serial No. 295,507. (No model.)

*To all whom it may concern:*

Be it known that I, CHARLES J. VAN DE-POELE, a citizen of the United States, residing at Lynn, in the county of Essex and State of Massachusetts, have invented certain new and useful Improvements in Pneumatic Flexible-Slot Conduits for Electric-Railway Conductors; and I do declare the following to be a full, clear, and exact description of the invention, such as will enable others skilled in the art to which it appertains to make and use the same.

My invention relates to improvements in sub-surface conduits for electric conductors, and more particularly to that form in which a traveling connection is established and maintained between the moving vehicle and the inclosed and protected supply-conductor by a contact device moving with the vehicle and extending through a surface-slot in the conduit.

The exclusion of water, dirt, and other objectionable matter and the maintenance of satisfactory insulation have hitherto presented great difficulties in the construction and operation of sub-surface conduits, both of which obstacles are entirely overcome by my present invention.

As heretofore constructed, conduits have in almost all cases been of considerable internal capacity, rarely less than one square foot, the object in many cases being to provide a space or chamber below the bare conductor or conductors for the reception of dirt, storm-water, &c., which was then conveyed away by suitable outlets. By my present invention the conditions are greatly altered, the actual space within which the bare conductor is supported being in most instances merely a groove of, say, one inch in width and three inches in depth, in which the conductor is placed. A flexible water-proof packing is located below and in some instances also between the surface or capping plates of the conduit, and is arranged to fit closely together, so that little if any surface-water would percolate through the meeting line of the opposing strips of packing. In connection with a conduit so constructed I employ a traveling contact, which separates the elastic slot-closing material, the portion entering the conduit being nothing more than a thin metal plate, which serves as the conductor for the electric current, and is so exceedingly small in cross-section that it does not open the packing anywhere except at the point where it is passing, so that water would not be able to effect an entrance except in minute quantities. Furthermore, the said elastic packing forms and constitutes of itself an admirable and effective insulation between the conductor-containing groove and the exterior metal portions of the conduit, and even were the conductor-containing groove filled with water very little or no current could leak by passing through to the outside. It is, however, best to prevent the entrance of water around the traveling contact or at damaged or defective points, and this I accomplish by supplying compressed air to the conduit and maintaining a pressure therein sufficient to blow out any previously-accumulated water and by escaping around the traveling contact effectually prevent its entrance. Furthermore, a higher degree of insulation would be maintained by the presence of the compressed air, which in view of the extremely small size of the conductor-containing chamber would not be required to be supplied in very large quantities. Of course the maintenance of a high degree of compression of the air inside the conduit would be impossible, since the flexible packing would yield and permit its escape; but a degree of pressure sufficient to prevent the entrance of water could be easily maintained and would add greatly to the efficiency of the system.

My invention may be carried out in a great variety of ways, several specific forms of conduit and of material available for the particular character of slot-closing media and a form of apparatus for automatically maintaining a supply of compressed air being shown in the accompanying drawings.

The present invention is an improvement upon that shown, described, and claimed in my prior patent, No. 347,905, dated August 24, 1886.

I am aware that the idea of closing a surface-slot to protect the interior of a sub-surface conduit is not broadly new; but so far as I am aware it has never been proposed to apply flexible water-proof insulating material located below or between the actual metallic wearing-surface of the conduit for this purpose, in connection with a supply of compressed air within the conduit, and I therefore claim the same, broadly.

Various details of construction and arrangement will be hereinafter described, and referred to in the claims, in connection with the drawings, in which—

Figure 3:
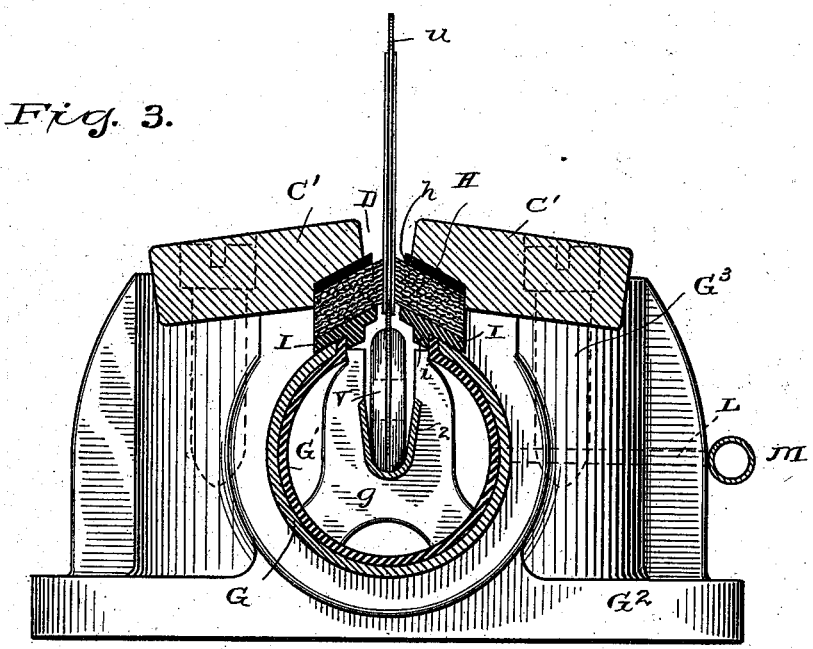

Figure 1 is a transverse sectional elevation of a sub-surface conduit embodying my invention. Fig. 2 is a transverse part-sectional elevation thereof. Fig. 3 is a transverse elevation, partly in section, showing a slightly-different form of conduit and traveling contact. Fig. 4 is a side elevation, partly in section, showing one side of a conduit with a traveling-contact device, the latter being in full lines. Fig. 5 is a plan view showing part of the conduit and one of the supporting-chairs. Fig. 6 is a transverse sectional elevation of a slightly-different form of conduit and slot closing device. Fig. 7 is a transverse sectional elevation of a slightly-different construction of conduit containing both positive and negative conductors. Fig. 8 is a view similar to Fig. 7, also showing a duplex form of conduit. Figs. 9 and 10 are transverse sectional elevations of differently-constructed duplex conduits. Fig. 11 is a diagrammatic view representing a part of an electric-conduit system embodying my invention, together with means for supplying compressed air thereto.

As herein shown, my improved conduit is of comparatively small size and may assume a number of different forms. As seen in Fig. 1, a trough-shaped metallic exterior casing, A, is supported within a suitable metallic chair, B, which is provided with upwardly-extending arms $b$, fitting closely against the sides of the casing A. The arms $b$ receive and sustain upon their upper extremities capping-plates C, which form the surface protection of the conduit, and between the inner edges of which a space is left to constitute the surface-slot D, through which the traveling-contact devices are introduced into the conduit.

An insulating-support is placed within the metallic casing A in order to sustain and protect the main-supply conductor. As seen in Fig. 1, the support consists of continuously-united pieces of wood E, which completely fill the lower portion of the casing A, so as to entirely exclude water and other foreign matter. The wood E is formed with a continuous groove along its upper side, within which is secured the main-supply conductor 1, which may be in the form of a slitted metallic tube. The conduit is closed against the entrance of water and other matter by flexible non-metallic strips of good insulating material, F. Molded rubber is admirable for this purpose; but on account of its cost I prefer to combine it with other less expensive material. A further advantage of such combination is found in the fact that I am thereby enabled to avail myself of the elasticity of the rubber, while at the same time making free use of lubricating material upon the facing, which will assist in rendering the slot air-tight and facilitate the passage of the traveling contact. A good form of slot-closing strip is composed of leather and rubber, a strip of leather being cemented to a similar strip of rubber by an insoluble cement which will prevent the rubber being attacked by the lubricating material. Said strips F are then laid face downward upon the upper edges of the wood E, and turned upwardly and brought face to face in the space between the surface-plates C, the said plates acting to press the strips F together and also downwardly, thereby effecting a perfectly water-tight and thoroughly-insulated joint between the said capping-plates and the interior wooden conductor-support. As seen in Fig. 1, the strips F extend into and completely fill the slot D, coming flush with the surface of the roadway; but that is not essential in all cases, nor do I limit myself to such construction, for, as shown in Fig. 3, the surface-slot is partly open and partly filled by the insulating packing-strips H. As there shown, the conduit-casing consists of an exterior metallic tube, G, which may be two and one-half or three inches in diameter. Said tube is provided with an insulating-lining, G', of vulcanized fiber or other good insulating material, which should of course fit or be attached to the interior of said tube as closely as possible to prevent the entrance of moisture and the consequent injury to the metallic casing.

The conductor 2 may be U-shaped instead of cylindric, and is desirably supported upon porcelain or other insulating bridges or chairs, G, which are slipped into place within the interior insulation, G', and in which the conductor is suitably secured. The packing-strips in this instance are desirably composed of a number of layers of fiber—such as canvas—which may be secured together by rubber cement or other desirable waterproofing compound, and provided at their upper side with continuous protecting-strips $h$ of hard insulating material. The fibrous portion of the strips H is incased at its under side by continuous strips of wood or vulcanized rubber I, which are provided along their lower side with a depending edge or formed with an equivalent recess, $i$. When in position, the edges or recesses $i$ of the strips I fit over the joint between the edges of the tubes G G' and serve to effectually close the same against the entrance of moisture. The capping-plates C' rest upon and securely hold the strips H in position and are separated from the tube G thereby. With this form the capping-plates are desirably rabbeted along their under edges to give more space to the insulating packing-strips H H.

A modification of the form just referred to comprises an exterior metallic tube, G, an exterior cylindric slitted conductor, 1, of less diameter than the tube G, and the space between the tubes is filled, and a thoroughly good and reliable insulation provided by pouring in insulating material G⁴ in a melted condition—such, for example, as bitumen. This form of conduit may be insulated by means of continuous cylindric packing-strips J J—such, for example, as any well-known form of woven rope thoroughly impregnated with plumbago and tallow or other insoluble lubricating material which will act to close the interstices and crevices in the ropes and maintain a close water-tight joint. The ropes J J may be secured in position by adhesive material; but they will be efficiently secured by forming the capping-plates C² with undercut recesses at their under edges.

The conduit heretofore described comprises a metallic casing and an insulated or insulating-lining, within or by which the conductor is supported, flexible insulating material being interposed between the insulating-lining and the casing. The casing is employed solely for the purpose of giving sufficient structural strength to the conduit as a whole and for protecting the parts from the action of moisture and other deteriorating influences. It will be obvious, therefore, that any practical substitute for the metallic casing might be employed—as, for example, walls of concrete or the like might be formed along the line of the conduit, suitable chairs being provided to support the capping-plates upon the upper edges of the concrete walls, and conductor-supporting insulating material be then disposed within the conduit so formed, substantially as herein set forth.

For temporary use, or in localities where wood is inexpensive and durable, any exterior protective casing other than the surface or capping plates may be dispensed with altogether, and the entire body of the conduit be composed of heavy wooden stringers A', laid in and sustained by chairs B, to which they may be secured.

As indicated in Fig. 7, both positive and negative conductors are carried in the groove $a'$, which forms the conductor-containing chamber. The positive and negative conductors 3 4 may be flat strips of good conducting metal secured vertically along opposite sides of the said groove $a'$. Separate current-collecting brushes 5 6 are arranged to move along the said conductors for collecting current therefrom. The upper part of the stringer A' is protected and the groove $a'$ closed by surface-pieces C³, also of wood, which will answer all purposes where the conduit is not subject to the wear and tear of passing vehicles; but wherever so exposed the wooden surface-pieces C³ should be provided with an exterior protective covering of metal C⁴, which may also extend over and between the edges of the pieces C³, where it will also serve to protect them from the wear of the passing traveler. Within suitable recesses, A², in the wooden pieces C³, is placed slot-closing packing material of any of the forms heretofore referred to, or, as shown, consisting of a rubber backing, $a^2$, and fibrous material, $a^3$. It will be obvious that in positions where wood can be largely used in the construction of subsurface conduits for electric conductors with economy as regards cost and durability the insulating properties of the wood will be very high, and therefore a conduit so constructed will possess a high degree of electrical efficiency. Where the main conductors are arranged in such close proximity, as indicated in Fig. 7, it necessarily follows that the system will be operated by current of relatively low tension. It is pointed out, however, that where an air-pressure is maintained within the conduit as proposed by me that the danger of a short circuit between said main conductors is very much decreased.

In Fig. 8 is seen the body of a conduit substantially similar to that shown in Fig. 7, except that an iron facing, C⁴, is provided along the exterior of the surface-pieces C³, and that the conductor-containing chamber $a^4$ is made much larger. Positive and negative main conductors 7 and 8 are arranged flatwise in separate grooves on either side of the chamber $a^4$; otherwise the structure is substantially the same as that just described.

In Fig. 9 is seen a form of conduit closely resembling that seen in Fig. 3, the principal difference being that the insulating-supports $g'$ are arranged to sustain two main supply-conductor, 9 and 10, said conductors being, for example, of the form seen in Fig. 1, and adapted for use in connection with the traveling-contact devices R. Two sets of traveling-contact devices—one for the positive and one for the negative conductor—may readily be combined to operate, as one of the conductors of each is insulated by mica or other thin insulating material and carried up through the slot in the form of a single shank, which would of course be somewhat thicker than if only a single-contact device were used. It will be obvious that two separate traveling-contact devices—one for the positive and one for the negative conductor—can be provided. This would, however, increase the difficulty of making switches, and for that reason particularly the duplex traveling-contact device is preferable.

The packing seen in Fig. 9 differs slightly from that in Fig. 3 in that the rubber pieces I are dispensed with, suitable undercut wooden strips, I², having downwardly-projecting parts $i^2$, being substituted therefor. Instead of the separate lining $g'$, I may use a lining, of canvas, cloth, or other fabric, secured within the interior and along the edges of the tube G by an insulating paint or substance.

In Fig. 10 is represented a duplex contact comprising a tube-and-slot closing device similar to that seen in Fig. 9. In this case, however, I show two U-shaped conductors, 11 12, which are supported in a suitable grooved wooden filling, A³, although they may of course be supported in suitably-shaped insulating-bridges, *g'*. The contact devices used with this construction may be a duplex form of the wheeled traveler seen in Figs. 3 and 4.

The exclusion of water, and consequently of all solid matter, being practically secured by the structure of my improved conduit, drainage-chambers and connections are rendered unnecessary, although valved outlets may be provided wherever desirable.

To prevent water or moisture entering through damaged or defective portions of the slot, the conduit is kept supplied with compressed air—as, for example, through feeder-pipes L, extending between the interior thereof, and mains M, leading from any suitable source of supply. For illustration, I have shown in Fig. 11 a plan view of a portion of a conduit and air-supply system embodying my invention. The conduit as a whole is indicated at O. P is a main air-supply pipe extending along the conduit wherever necessary for an adequate supply of compressed air thereto. L are inlet-pipes from the main P to the body of the conduit O.

Q represents a pressure-blower, which may be the well-known Root blower or any other device. The blower is suitably connected with the supply-pipes P and mains M by pipes *m*.

N is an electric motor, a pulley, *p*, on the armature-shaft of which is belted or otherwise connected to the mechanism of the blower Q.

1 and 2 are the positive and negative conductors extending to the binding-posts of the motor. 3 and 4 are mercury-cups included in the circuit of the conductors 1 and 2. 5 is a metallic bridge, by which the mercury-cups may be connected and the circuit of the motor completed at desired times. 6 is an automatic circuit-controller consisting of an air-bag adapted to expand or contract according to the pressure of the air in the main M. To the bag 6 is connected a lever, 7, which is attached to the bridge 5 by suitable connection, 8, and thereby raises or lowers the same to open or close the motor-circuit or regulate the current and speed of motor as the pressure in the mains rises or falls above or below the desired point, the object being to render the air-supply apparatus automatic in its action, whereby it will maintain an approximately constant pressure in the main M, and distributing or feeder pipes L. The air-pressure within the conduit need not be above a few pounds to the square inch, since that will suffice to prevent water entering about the traveling contact or at defective places, and also to eject any accumulated moisture by blowing it out through the slot at depressed points along the conduit. Furthermore, any injury or damage to the conduit will be readily detected by sudden or unusual variations in pressure. Current is collected from the supply-conductor within the conduit, and carried thence by suitable connections to the motor on the traveling vehicle by a contact device extending through the flexible slot in the conduit of whatever form, and acting to slightly separate the edges thereof in its passage therealong. It is desirable that the upwardly-extending part or shank of the traveling contact be as thin as is consistent with the work of moving the actual contact-surface along the conductor.

As seen in Figs. 1 and 2, the traveling-contact device R is provided with a vertical thin metallic plate or shank, R', which extends between the inner surface of the conducting-strips F F, moving in close contact therewith. The shank R' is sloped upwardly from its lower edges, so that in its movement the tendency will be to open the slot upwardly. The lower edge of the shank R' is provided or formed with cylindric extensions *r r'*, adapted to slide freely within the slitted cylindric conductor 1. Three of the extensions are shown—one at each end of the extended portion of the shank R', and one, *r'*, at the center thereof—and between these projections are secured short cylindric pieces of hard carbon, S. The carbon rubbing-blocks S are perforated longitudinally, and desirably secured in position by a wire, *s*, which should be grooved, in order to press the said blocks S against opposite sides of the conductor 1, thereby insuring good electrical contact. The wire *s* should be of some resilient metal, so that as the blocks S wear it will continue to hold them against the conductor until they become too small for use, when by withdrawing the wire they can readily be removed and other blocks sprung on the wire, which is secured in any desired manner in the end extensions, R R, of the contact device. That part of the shank R' which extends above the packing-strips F F is surrounded and provided by a layer of insulating material, $R^2$, upon the exterior of which are secured metallic protecting-plates T, which are united at their extremities and sloped downwardly to form plows adapted to push aside or scrape away any dirt or objectionable matter that may be upon the conduit.

I do not limit myself to any particular form of conductor or current-collecting brush, block, or device, having shown several forms suitable for use with my improved conduit. Other and additional forms are also shown in another application filed contemporaneously herewith.

As seen in Figs. 3 and 4, wheels may be substituted for the rubbing-blocks just referred to. The traveling-contact device U comprises a central metallic plate or shank, *u*, along the lower edge of which are secured a number of metallic wheels or rollers, V, adapted to move in contact with the entire surface of the conductor 2. The plate *u* is here shown as protected by very thin insulating material, W, preferably mica, upon the exterior of which are attached thin metallic plates *w*, which are united along their front edge and rounded off to form plows, which in this instance project downwardly through the slot-closing material and separate the same with the movement of the traveler.

The insulated form of traveling-contact devices may be desirable in some instances where obstructions, surface-water, or other difficulties are met; but ordinarily I prefer to use a traveling contact having an unprotected bare metallic shank, since with that form the shank may be so very much thinner, and moving between the insulating slot-closing strips, a very efficient degree of insulation will be provided.

Where two conductors and a duplex traveling-contact device are employed, the upwardly-extending shanks thereof may be made thinner than where a single one only is used, and said shanks may be mechanically united to combine their strength, a suitable thin insulation being placed between them and permitted to project slightly beyond their edges. The outer surface of the conducting-shank can be left bare, as already described. With this construction the part of the traveling contact passing between the slot-closing material will still be exceedingly thin, so that the said slot will not be opened to any great extent during its travel. The positive and negative conducting-shanks may, however, be entirely separate and of the same thickness and construction as though for use with single conductors. A pair of traveling contact devices can then be combined—one in rear of the other—and the shanks brought up and secured to a suitable piece of insulating material which would make a smooth even joint between their adjacent edges.

I do not wish to confine myself or be understood as limiting the present invention to any particular means, method, or manner of supplying compressed air to the conductor-containing chamber within the conduit, since such is not my intention. For illustration, I have shown a system of supplying air by means of main and feeder pipes from a central distributing-point; but I may also employ air-feeding devices comprising an electric motor and air-compressor, the latter connected directly with the conductor-containing chamber, while the motor may be in circuit with the conductor or conductors. Any number of such air-supply stations may be used along the line of the conduit, and the motors may be arranged to run continuously or be provided with automatic regulating devices of any known or desired kind.

The system of insulation in my improved conduit is so thorough and complete that there will be no need for the air-pressure during dry weather, its great advantage being that by its use the very greatly-increased difficulty of maintaining insulation in wet weather is practically overcome.

Having described my invention, what I claim, and desire to secure by Letters Patent, is—

1. A conduit for electric conductors, comprising a slotted exterior casing and means for supplying compressed air thereto and for maintaining an air-pressure therein, substantially as described.

2. A conduit for electric conductors, comprising a slotted exterior casing, flexible slot-closing strips normally in contact to close the conduit, and means for supplying compressed air to the interior of the conduit, substantially as described.

3. A conduit for electric conductors, comprising a slotted exterior casing, flexible slot-closing strips normally in contact to close the conduit, insulating-supports within the conduit and an electric conductor thereon, and means for supplying compressed air to the interior of the conduit, substantially as described.

4. A slotted conduit for electric conductors, comprising an exterior slotted casing, an interior insulating-support and an electric conductor thereon, flexible insulating slot-closing strips located between the casing and the interior insulation, and means for supplying compressed air to the interior of the conduit for excluding or expelling water, substantially as described.

5. A slotted conduit for electric conductors, comprising an exterior slotted casing, an interior insulating-support and an electric conductor thereon, flexible insulating slot-closing strips located between the edges of the casing and the interior insulation, and means for supplying compressed air to the interior of the conduit for excluding or expelling water, substantially as described.

6. A slotted conduit for electric conductors, comprising an exterior casing, an interior insulating lining or support, an electric conductor or conductors upon said support, flexible insulating slot-closing strips located between the casing and the interior insulation, a thin traveling-contact device extending upwardly from the conductor and acting to forcibly separate the slot-closing strips during its passage, and means for supplying compressed air to the interior of the conduit for preventing the ingress of water around the traveling-contact device, substantially as described.

7. A slotted conduit for electric conductors, comprising an exterior metallic casing, an interior insulating lining or support, an electric conductor or conductors upon said support, flexible insulating slot-closing strips located between the metallic casing and the interior insulation, a thin traveling-contact device extending upwardly from the conductor and acting to forcibly separate the slot-closing strips during its passage, and means for supplying compressed air to the interior of the conduit for preventing the ingress of water around the traveling-contact device, substantially as described.

8. The combination, with a closed slotted conduit, of means for supplying compressed air thereto, comprising one or more air-compressors, and an inlet pipe or pipes connecting the conduit and compressors, whereby a substantially equal pressure may be maintained throughout.

9. A conduit for electric conductors, comprising an exterior metallic casing, an electric conductor within said conduit, and suitable insulating-supports therefor, slot-closing strips formed of flexible insulating material and located so as to close the surface-slot, means for supplying compressed air, comprising one or more air-compressors, a system of inlet-pipes from the air compressor or compressors to points along the conduit, and connections between said inlet-pipes, whereby a substantially equal pressure may be maintained in all parts thereof, substantially as described.

10. The combination, with a closed slotted conduit, of means for supplying compressed air thereto, comprising one or more air-compressors, and connecting-pipes leading therefrom to the interior of the conduit, a motor for actuating each compressor, and a motor-controlling device under the influence of and actuated by the variations of pressure in the air-pipes to start, stop, or regulate each motor, substantially as described.

11. In a slotted conduit for electric conductors, the combination, with an exterior casing, of a tubular or hollow main-supply conductor or conductors within the conduit, a contact device extending from the exterior of the conduit into contact with the inner surface of said conductor or conductors, and flexible insulating slot-closing strips at the edges of the exterior casing and closing about the upward extension of the traveling-contact device.

12. In a slotted conduit for electric conductors, the combination, with an exterior casing and an insulating-lining therefor, of a tubular or hollow main-supply conductor or conductors within the lining, a contact device extending from the exterior of the conduit into contact with the inner surface of said conductor or conductors, and flexible insulating slot-closing strips at the edges of the exterior casing and closing about the upward extension of the traveling contact device, substantially as described.

In testimony whereof I hereto affix my signature in presence of two witnesses.

CHARLES J. VAN DEPOELE.

Witnesses:
J. W. GIBBONEY,
E. D. PRIEST.